(12) United States Patent
Kennedy

(10) Patent No.: US 7,643,631 B2
(45) Date of Patent: Jan. 5, 2010

(54) ENCLOSURE FOR BROADBAND SERVICE DELIVERY SYSTEM

(75) Inventor: Bryan Kennedy, Norcross, GA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 762 days.

(21) Appl. No.: 11/212,924

(22) Filed: Aug. 26, 2005

(65) Prior Publication Data

US 2007/0047721 A1    Mar. 1, 2007

(51) Int. Cl.
*H04M 1/00* (2006.01)
*H04M 9/00* (2006.01)

(52) U.S. Cl. .......................... 379/413.04; 379/399.01; 379/413.02; 385/135; 385/139; 361/641; 361/657; 361/669

(58) Field of Classification Search ............... 379/1.03, 379/1.04, 93.05, 93.06, 93.09, 22.04, 22.05, 379/399.01, 413.02, 413.03, 413.04; 385/133, 385/134, 135, 139; 361/641, 643, 644, 655, 361/657, 658, 667, 669
See application file for complete search history.

(56) References Cited

U.S. PATENT DOCUMENTS

| | | | | |
|---|---|---|---|---|
| 4,160,880 | A | * | 7/1979 | Brey .......................... 439/571 |
| 4,547,034 | A | | 10/1985 | Forberg et al. |
| 4,846,735 | A | | 7/1989 | Teichler et al. |
| 4,871,330 | A | | 10/1989 | Muller et al. |
| 4,910,770 | A | * | 3/1990 | Collins et al. .......... 379/413.02 |
| 5,033,974 | A | | 7/1991 | Biederstedt et al. |
| 5,157,580 | A | | 10/1992 | Hegner et al. |
| 5,163,855 | A | | 11/1992 | Gerke et al. |
| 5,455,856 | A | | 10/1995 | Story |
| 5,494,461 | A | | 2/1996 | Bippus et al. |
| 5,574,614 | A | | 11/1996 | Busse et al. |
| 5,641,312 | A | | 6/1997 | Bippus et al. |
| 5,734,776 | A | * | 3/1998 | Puetz ......................... 385/134 |
| 5,999,412 | A | | 12/1999 | Busse et al. |
| 6,026,160 | A | * | 2/2000 | Staber et al. ........... 379/413.03 |
| 6,068,503 | A | | 5/2000 | Gerke et al. |
| 6,115,467 | A | * | 9/2000 | Daoud .................... 379/413.02 |
| 6,266,348 | B1 | | 7/2001 | Gross et al. |
| 6,282,285 | B1 | * | 8/2001 | Daoud .................... 379/399.01 |
| 6,426,961 | B1 | | 7/2002 | Nimmagadda |
| 6,470,074 | B2 | | 10/2002 | Teixeria |
| 6,510,226 | B1 | * | 1/2003 | Thomann et al. ....... 379/413.04 |

(Continued)

OTHER PUBLICATIONS

Krone, White Paper ADSL Service Delivery, Jan. 21, 2003, 8 pgs.

*Primary Examiner*—Binh K Tieu
(74) *Attorney, Agent, or Firm*—Merchant & Gould P.C.

(57) ABSTRACT

An enclosure used with a system for delivering broadband service, including standard telephone service and telephone/DSL service, to a subscriber. The system includes a pair gain system, a cross-connect system, and a service distribution system. The enclosure is a retro-fit enclosure that incorporates the service distribution system into an existing cross-connect enclosure in a cost-effective and aesthetic manner. The service distribution system is operably located such that the standard telephone service and telephone/DSL service are routed from the service distribution system to the subscriber without being routed through the cross-connect system. The service distribution systems include terminating modules and switching modules. In some embodiments, the switching modules include protector plugs that protect the system from over-voltages and/or over-currents, and provides upstream and downstream diagnostic testing.

7 Claims, 14 Drawing Sheets

U.S. PATENT DOCUMENTS

| | | |
|---|---|---|
| 6,574,309 B1 | 6/2003 | Chea et al. |
| 6,603,850 B1 | 8/2003 | Stahl et al. |
| 6,657,966 B1 | 12/2003 | Kramarczyk et al. |
| 6,735,293 B2 | 5/2004 | Doherty et al. |
| 6,778,525 B1 | 8/2004 | Baum et al. |
| 6,785,325 B1 | 8/2004 | Liu et al. |
| 6,826,280 B1 | 11/2004 | Sajadi et al. |
| 7,018,229 B2 * | 3/2006 | Otto et al. ................ 439/381 |
| 7,400,816 B2 * | 7/2008 | Reagan et al. ............. 385/139 |
| 7,457,503 B2 * | 11/2008 | Solheid et al. ............. 385/135 |
| 7,462,779 B2 * | 12/2008 | Caveney et al. ........... 174/68.1 |
| 2002/0168054 A1 | 11/2002 | Klos et al. |
| 2004/0013387 A1 * | 1/2004 | Wakileh et al. ............ 385/134 |
| 2004/0095956 A1 * | 5/2004 | Henderson et al. ......... 370/463 |
| 2004/0172660 A1 * | 9/2004 | Milbrandt et al. .......... 725/129 |
| 2004/0259396 A1 | 12/2004 | Mueller et al. |

\* cited by examiner

ENCLOSURE FOR BROADBAND SERVICE DELIVERY SYSTEM

CROSS-REFERENCE TO RELATED APPLICATIONS

This application is related to an application entitled SYSTEM FOR BROADBAND SERVICE DELIVERY, having Ser. No. 11/212,925; which application is being filed concurrently herewith and is incorporated herein by reference.

TECHNICAL FIELD

This disclosure relates generally to digital subscriber lines, and more specifically, to a method and system for delivering digital subscriber line service to a subscriber.

BACKGROUND

Digital subscriber line (DSL) technology allows for high-bandwidth networking connections to be made over ordinary copper telephone lines. Traditional phone service typically relies on unshielded twisted pair (UTP) copper lines to connect homes and small businesses to the communications network operated by the telephone company (TELCO). Every one of these networks includes a central offices (CO) that services a defined region, with each CO responsible for connecting and routing calls directed to sites that reside both internal to and external of the network.

Branching out from the central office are numerous remote terminals (RT) located throughout the region being served by the CO, with each RT providing the phone service for the subscribers located within a specific area or neighborhood. One of the primary components that make up a remote terminal (RT) is a pair gain system, also known as a derived carrier system, or digital loop carrier system. In simplest terms, the pair gain system provides the TELCO with the capability to carry multiple services over a lesser number of lines, for example, five conversations over one telephone line. The pair gain system also is responsible for generating the dial tone signal one hears when they first pick up a telephone handset, indicating that an active connection is present.

FIG. 1 depicts a typical telephone connection between a pair gain system 1 of a remote terminal (RT) (not shown) and a subscriber 3. As indicated in FIG. 1, the connection between the pair gain system 1 and the subscriber 3 is not accomplished directly, but instead in two legs. The first connection 1a exists between the pair gain system 1 and a cross-connect block 2, while the second connection 2a is made between the cross-connect block 2 and the subscriber 3. As indicated by its name, the purpose of the cross-connect block 2 is to allow easy matching and connecting of two or more connections to one another, thereby facilitating the addition or removal of phone services to or from the subscriber. In most applications, the number of subscriber connections at the cross-connect block is greater than the number of pair gain system connections; typically the ratio of subscriber connections to pair gain connections is 2:1.

To further illustrate the use of the cross-connect block 2, consider the following example involving a typical modern day residence. New homes are often pre-wired to handle multiple telephone lines, i.e. six lines, to allow for future expansion. In this situation, there would be six connections running between the subscriber's house 3 and the cross-connect box 2. However, if the subscriber only has two active phone lines, then only two connections representing the active circuits would run from the pair gain system 1 to the cross-connect box 2. Later, if the subscriber wishes to add a new telephone line for a fax machine, a technician would have to run a new connection between the pair gain system 1 and the cross-connect block 2, matching the new connection at the cross-connect block 2 to the appropriate connection already present that runs to subscriber's house 3.

Note that each of connections 1a and 2a, along with the connections discussed below, although drawn as single lines in the figures, actually represent a cable pair, such as, for example, typical unshielded twisted pair (UTP) copper lines. For the remainder of the application, the terms "connection", "cable pair", and "line" should be considered interchangeable.

As DSL technology is relatively new compared to typical telephony communication involving analog signals, many of the remote terminals (RT) that are part of a telephone company's (TELCOS) network were not designed to allow easy incorporation of newer technology such as DSL. Accordingly, the TELCOs have had to develop ways to effectively provide DSL service to their subscribers utilizing the existing equipment on the network.

FIG. 2 depicts a typical approach to incorporating DSL service with a remote terminal (RT). The dial tone signal generated by the pair gain system 1 is directed to a splitter 5 via connection 1a. The splitter 5 also receives a connection 4a from a DSL system 4. The DSL system 4 includes the equipment necessary for processing and directing the data signals back and forth between the subscriber 3 and a digital subscriber line access multiplexer (DSLAM) (not shown). The DSLAM, which is operated by a service provider, takes all of the subscribers' DSL connections and aggregates them onto a single, high-density connection to the Internet. For the current illustrative example involving the integration of DSL at an RT, the DSL system may be physically mounted inside the cabinet housing the RT, or placed in its own cabinet mounted onto or next to the RT depending on factors such as size limitations and ease of access.

The role of the splitter 5 is to combine the lower frequency signal from the pair gain system 1 with the higher frequency DSL data signal in such a way that they do not interfere with one another. Similarly, the splitter 5 must also be capable of separating the signal sent by the subscriber 3 back into its two constituent components and then direct them back to the appropriate system. In FIG. 2, the splitter 5 is depicted as an independent component separate from the DSL system 4. Alternatively, the splitter 5 may be incorporated into the DSL system 4.

The combined signal produced by the splitter 5 is delivered to the cross-connect block 2 over connection 5a, where it is then directed to the subscriber 3 over connection 2a. Subscribers 3 can then access the higher frequency DSL signal by means of a DSL modem connected between their computing device and the telephone line(s) running throughout their residence. At the same time, standard telephones continue to have access to the lower frequency analog signals also routed over the line(s).

SUMMARY

The present disclosure relates to retro-fitting existing cross-connect system enclosures to incorporate a service distribution system in a cost-effective and aesthetic manner. The service distribution system includes terminating modules having insulation displacement connections. The modules may include double terminated block sites with closed switches. The terminating modules are configured for use with switching modules. In one embodiment, the switching modules have circuit protection plugs. The service distribution system is operably configured to be in series with and downstream from the cross-connect system.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
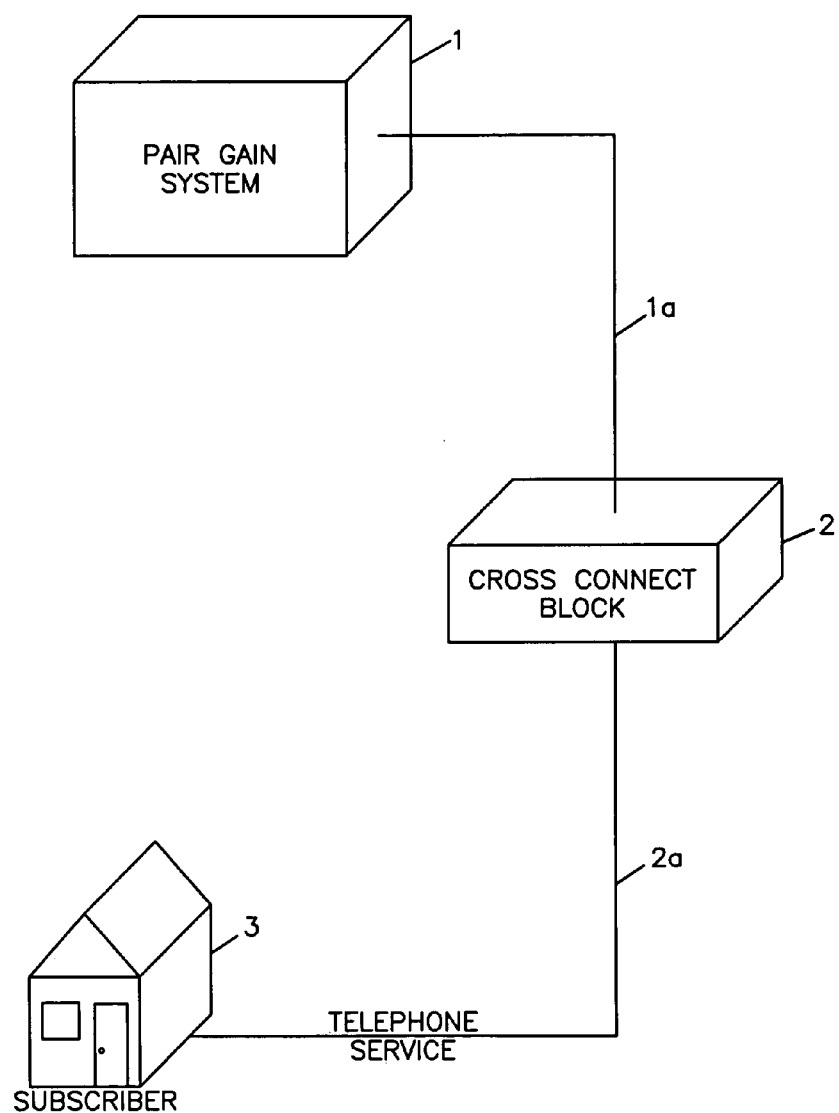
FIG. 1 is schematic representation of a prior art system for distribution of telephony communication service to a subscriber.
Figure 2:
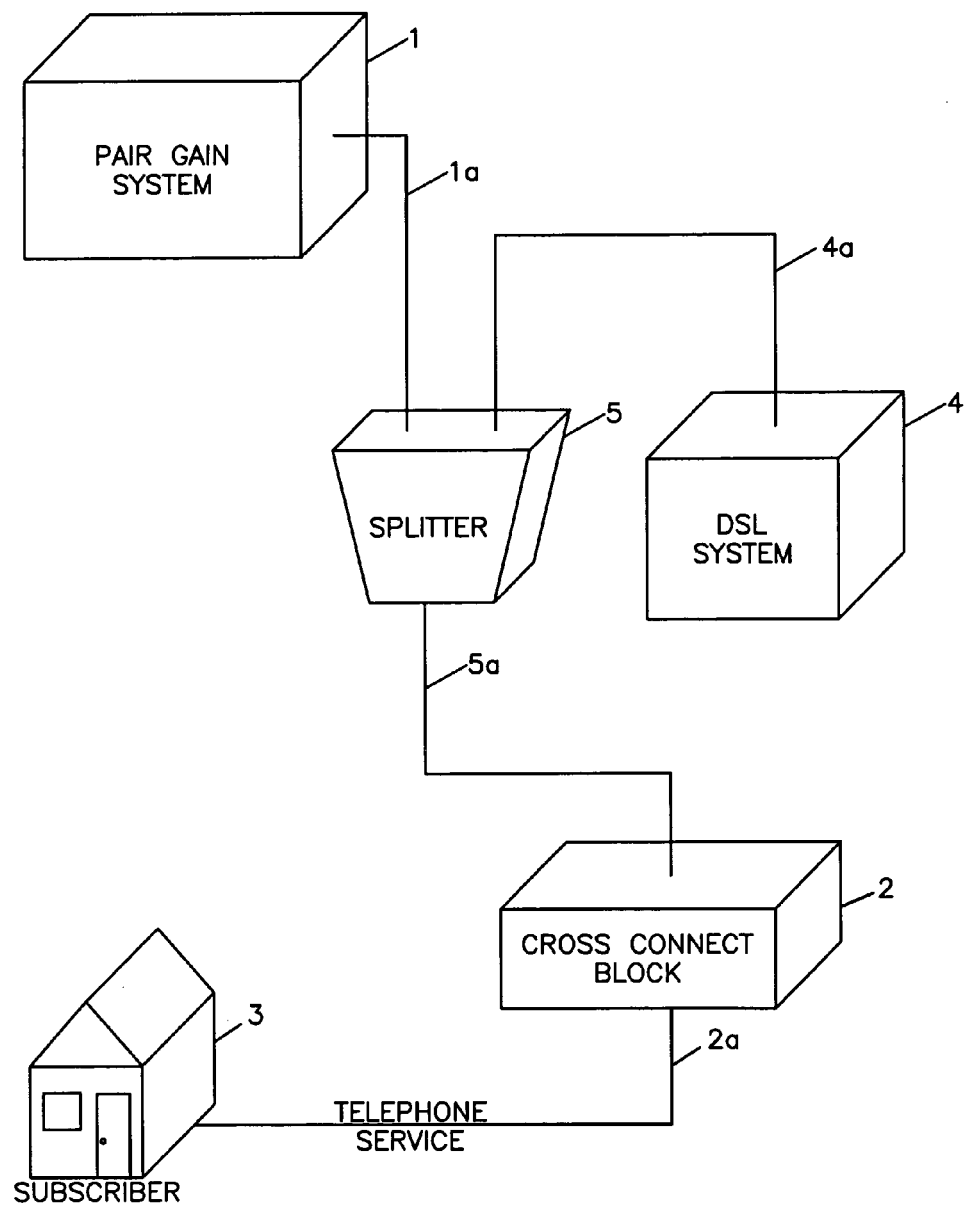
FIG. 2 is a schematic representation of a prior art system for distribution of telephony communication service and digital subscriber line data service to the subscriber.
Figure 3:
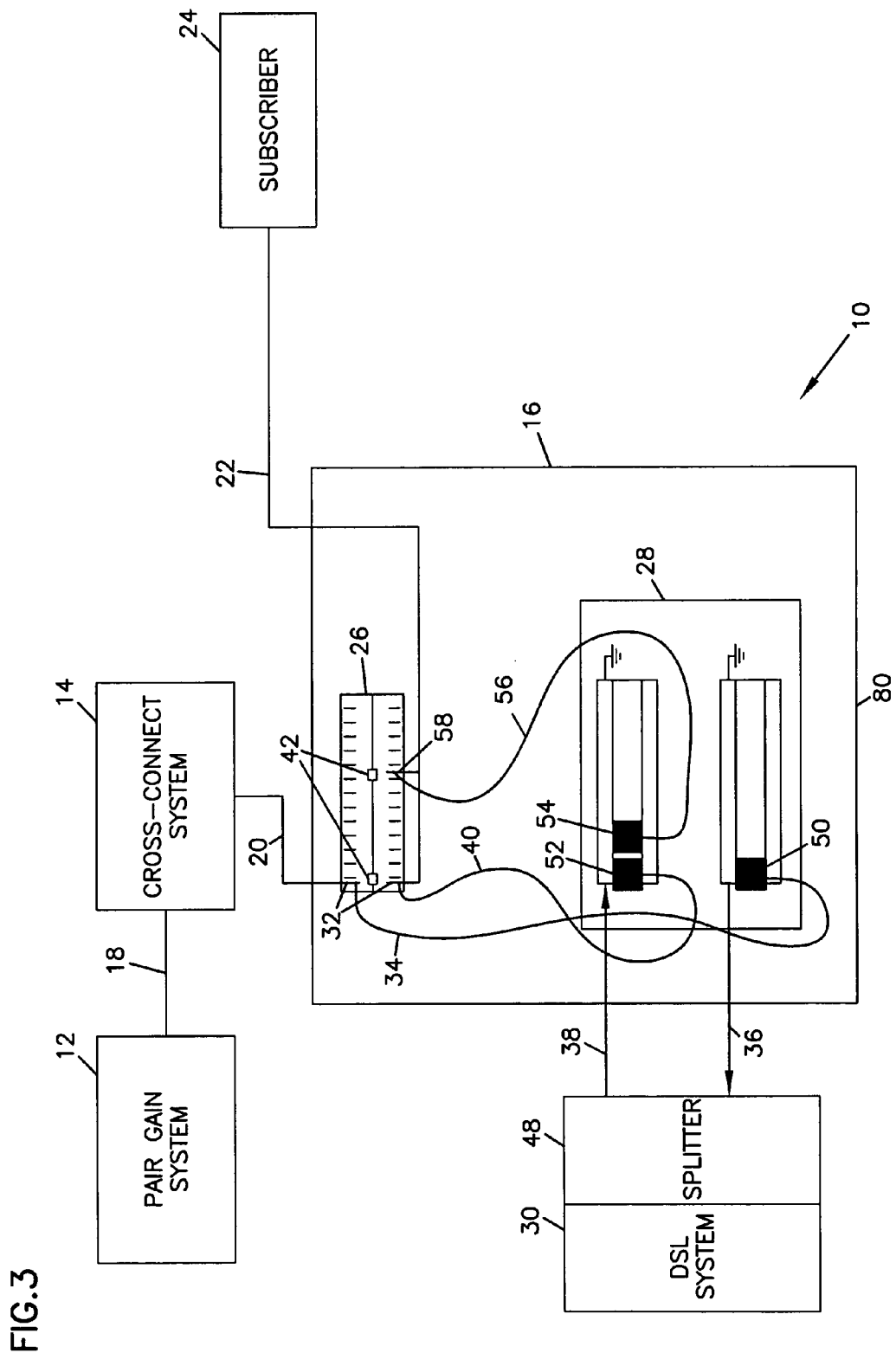
FIG. 3 is a schematic representation of one embodiment of a system for broadband service delivery, in accordance with the principles of the present disclosure.

Referring to FIG. 3, an overall schematic representation of one embodiment of a system 10 for providing broadband service is illustrated. The system 10 includes a number of subsystems: including, a pair gain system 12, a cross-connect system 14, and a service distribution system 16.

The pair gain system 12 connects to the cross-connect system 14 by a feeder line or connection 18. The cross-connect system 14 connects to the service distribution system 16 by an incoming block line or connection 20. The service distribution system 16 connects to a subscriber 24 by a distribution line or connection 22. Through these connections 18, 20, 22, the subscriber 24 is provided with either standard telephone service or DSL service (DSL service is intended to mean service that includes a lower frequency telephone signal and a higher frequency DSL data signal).

The service distribution system 16 of FIG. 3 generally includes a terminating block or module 26 and a switching module 28. The switching module 28 is interconnected to a splitter 48 and DSL system 30. For standard telephone service, the cross-connect system 14 receives an incoming, pair gain signal (also referred to herein as a telephone signal) from the pair gain system 12, which in turn, is directed to the service distribution system 16 via the incoming block line 20. The telephone signal is received by the terminating module 26 and is routed as an outgoing service signal directly to the subscriber 24 via the distribution line 22. That is, the telephone signal is routed through the terminating module 26 to the subscriber 24, without being directed or routed through the switching module 28.

In the illustrated system 10, the terminating module 26 is configured to selectively route the incoming pair gain signal either directly to the subscriber 24, as previously described, or to the switching module 28. Accordingly, the outgoing service signal can be directed to the subscriber 24 in the form of a standard telephone signal, or directed through the switching module 28 and then to the subscriber 24 in the form of a telephone/DSL signal. Preferably, the terminating module 26 has a normally-closed configuration that provides a built-in cut-through that passes the telephone signal from the incoming block line 20 to the distribution line 22, and to the subscriber 24 in the form of the standard telephone service by default.

Still referring to FIG. 3, to provide DSL service (i.e. the telephone/DSL signal) to a particular subscriber 24, a service technician accesses a dedicated site 32 of the terminating module 26. The dedicated site 32 is a particular site or connection location of the terminating module 26 that is dedicated to the particular subscriber. The technician re-routes the telephone signal at that dedicated site 32 of the terminating module 26 to the switching module 28. The switching module 28 passes the signal to the splitter 48, which functions to combine the telephone signal with a DSL signal from the DSL system 30.

Figure 4:
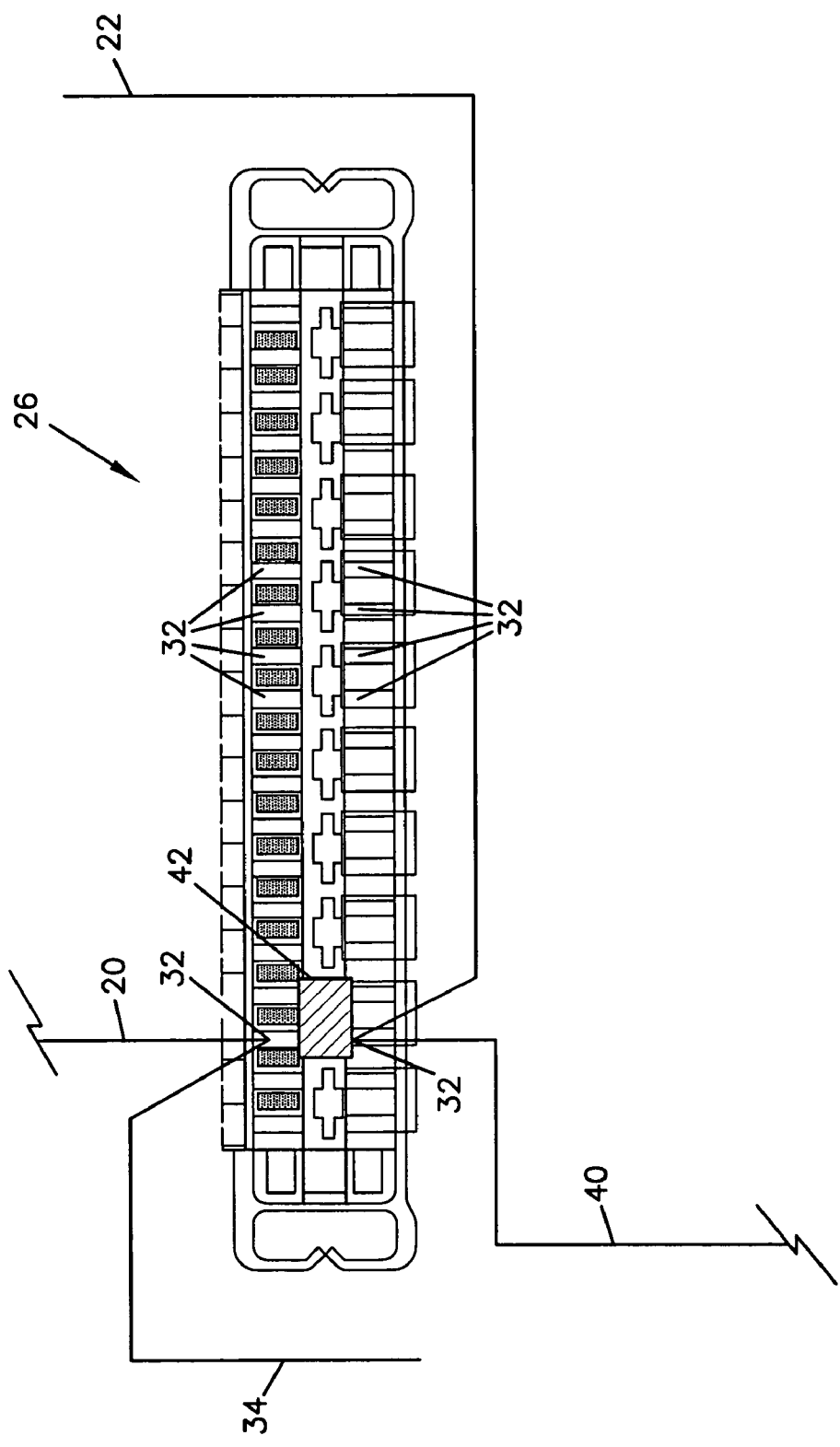
FIG. 4 is a schematic representation of a terminating module shown in the system of FIG. 3.

Referring to FIG. 4, the terminating module 26 includes a plurality of block sites 32. Preferably, each of the block sites 32 can be double terminated, that is, each of the block sites 32 provides a first termination location or connection 60 (FIG. 5) for terminating each of the incoming block line 20 and a first connection 34. Because the sites 32 can be double terminated, the service technician is not required to re-wire the incoming block line 20 from the block site 32 to the switching module 28 when DSL service is requested. Instead, the telephone signal can simply be re-routed from the terminating module 26 to the switching module 28 via the first connection 34.

Referring again to the service distribution system 16 of FIG. 3, incoming and outgoing DSL connections 36, 38 are established between the splitter 48/DSL system 30 and the switching module 28. Also, a second connection 40 that carries the combined telephone/DSL signal is established between the switching module 28 and the terminating module 26 when DSL service is activated. Similar to the first connection 34, the second connection 40 is double terminated with the distribution line 22 at a second termination location or connection 62 (FIGS. 5 and 6) of the terminating module 26.

To activate DSL service for the subscriber 24, the service technician modifies the terminating module 26 so that a first signal path from the incoming block line 20 to the distribution line 22 is disrupted. Because the first signal path through the terminating module 26 is disrupted, the telephone signal from the pair gain system 12 is re-routed through the terminating module 26 to a second signal path, i.e., through the first connection 34 and to the switching module 28. From there, the telephone signal is passed along the second signal path to the splitter 48. At the splitter 48, the telephone signal is combined with the DSL signal from the DSL system 30. The combined telephone/DSL signal is returned from the splitter 48 to the switching module 28 by the outgoing DSL connection 38. From the switching module 28, the combined telephone/DSL signal is carried along the second signal path to the terminating module 26 via the second connection 40, and then to the subscriber 24 via the distribution line 22.

Figure 5:
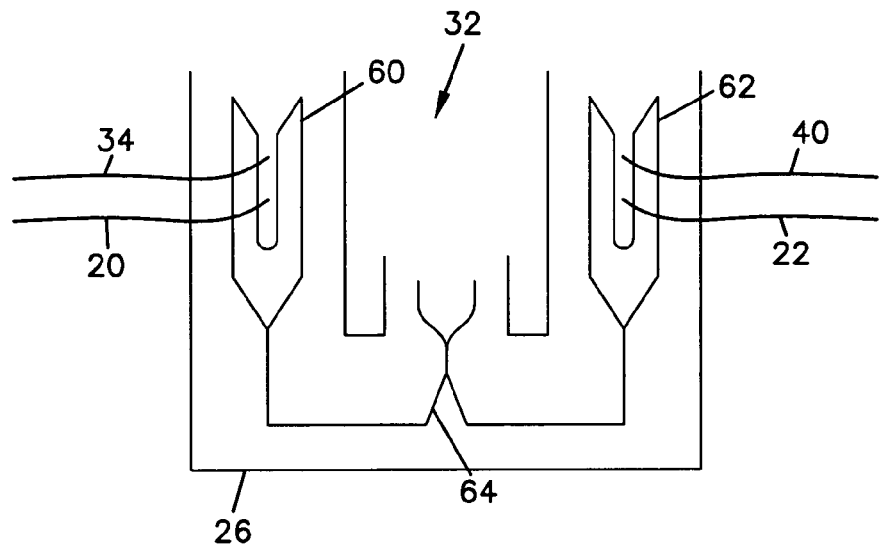
FIG. 5 is a schematic representation of a disconnection contact of the terminating module of FIG. 4, shown in a normally-closed state.
Figure 6:
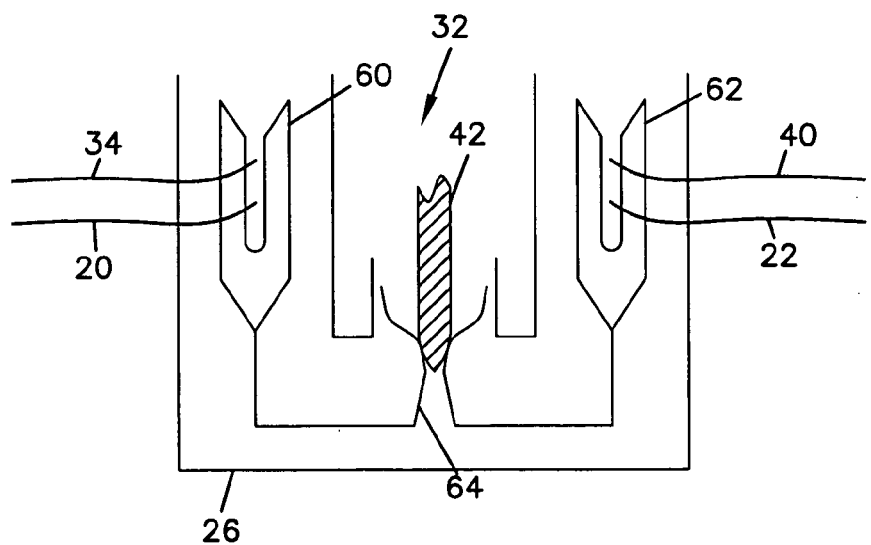
FIG. 6 is a schematic representation of the disconnection contact of FIG. 5, shown in an open state.

Referring to FIGS. 4, 5, and 6, in the illustrated embodiment, the terminating module 26 is an insulation displacement connection (IDC) block. Unlike blocks that rely on screw-terminals or a wire wrapping technique to secure wires to the block, IDC blocks provide for a gas-tight connection without requiring the removal of insulation covering the wire. Connection is achieved once a wire is placed into an IDC block contact, and then punched down, typically via an insertion tool that presses the wire against the contact to form the gas-tight connection. Because of the ease of use and effectiveness, terminating blocks utilizing IDC contacts have become the standard within the telecommunications industry.

To modify the terminating module 26 and activate DSL service (i.e., disrupt the first signal path), the technician first adds the first and second jumper connections 34, 40 between the terminating module 26 and the switching module 28. An activation plug 42 is then inserted into the terminating module 26. When the activation plug 42 is inserted into the terminating module 26, the plug 42 effectively disrupts or opens the first signal path through a normally-closed contact 64 (FIGS. 5 and 6) that previously allowed the telephone signal from the pair gain system 12 to cut through the terminating module 26. As a result of disrupting the first signal path, the second signal path is established. The second signal path re-routes the telephone signal to the switching module 28 and the splitter 48, thereby activating DSL service to the subscriber 24.

Figure 8:
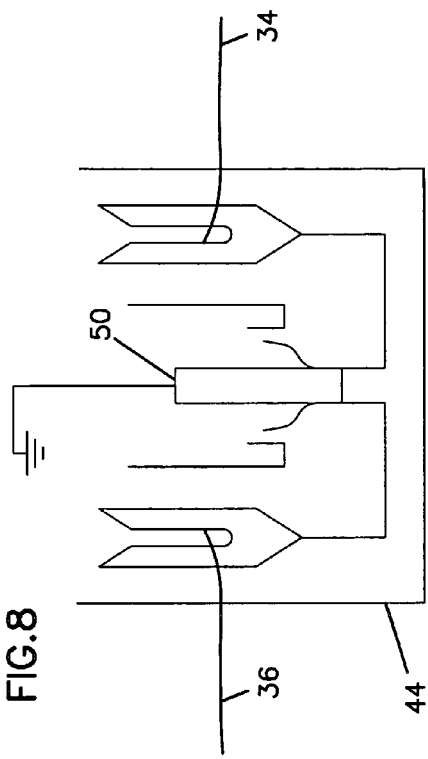
FIG. 8 is a schematic representation of a switching contact of the switching module of FIG. 7.

As can be understood, if the subscriber 24 wishes to de-activate DSL service, the plug 24 is simply removed from the terminating module 26 and the first signal path is re-established to provide the subscriber 24 with only the standard telephone signal. In some instances, at least the first jumper connection 34 or both of the first and second jumper connections 34, 40 are also removed from the system so that the parallel connection to the switching module 28 is eliminated. In one embodiment, the activation plug 42 can be stored in the switching module 28 when not used in the terminating module 26, as the switching module 28 has a normally-open configuration (FIG. 8) that accepts storage of the activation plug 42.

By this arrangement, a technician can easily activate and de-activate DSL service to the subscriber 24 simply by inserting and removing the activation plug 42 into and from the terminating module 26. Accordingly, the technician is not required to re-wire the system whenever the subscriber requests a service change. In addition, as previously described, the terminating module 26 of the system defaults to providing the standard telephone service to the subscriber, thereby eliminating occurrences of a "downed" subscriber due to mistakenly forgetting to re-wire a circuit. Details of the function and operation of another system including a terminating module are shown a described in U.S. patent application Ser. Nos. 10/301,960 and 10/725,108; which applications are incorporated herein by reference.

Figure 7:
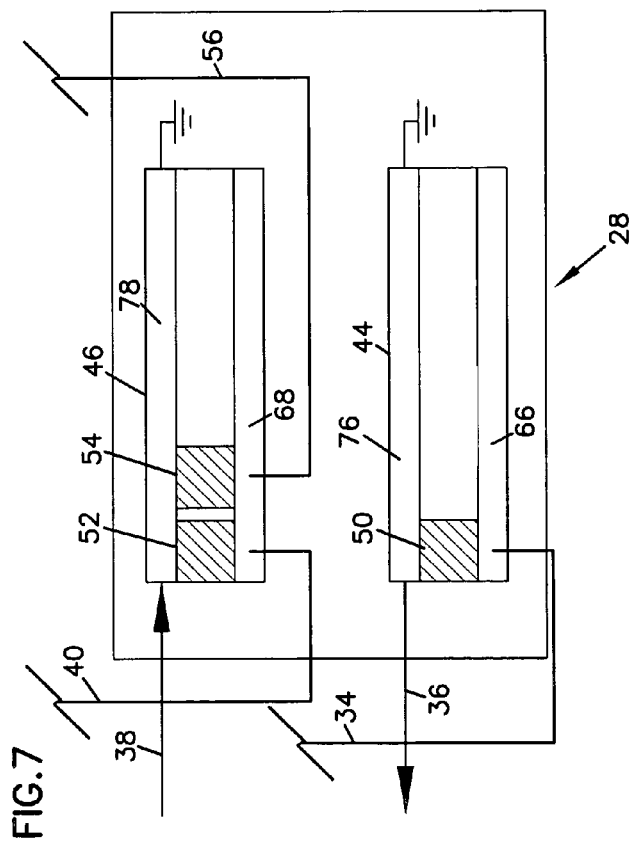
FIG. 7 is a schematic representation of a switching module shown in the system of FIG. 3.

Referring now to FIGS. 3 and 7, the switching module 28 of the present system 10 includes a first termination block 44 and a second termination block 46. The first termination block 44 includes a first row of contacts 66 (FIG. 7) and a second row of contacts 76. The second termination block 46 includes a first row of contacts 68 and a second row of contacts 78. The first connection 34 interconnects the terminating module 26 to the first row of contacts 66 of the first termination block 44, and the second connection 40 interconnects the terminating module 26 to the first row of contacts 68 of the second termination block 46. Also, the incoming DSL connection 36 interconnects the splitter 48 to the second row of contacts 76 of the first termination block 44, and the outgoing DSL connection 38 interconnects the splitter 48 to the second row of contacts 78 of the second termination block 46.

Figure 8A:
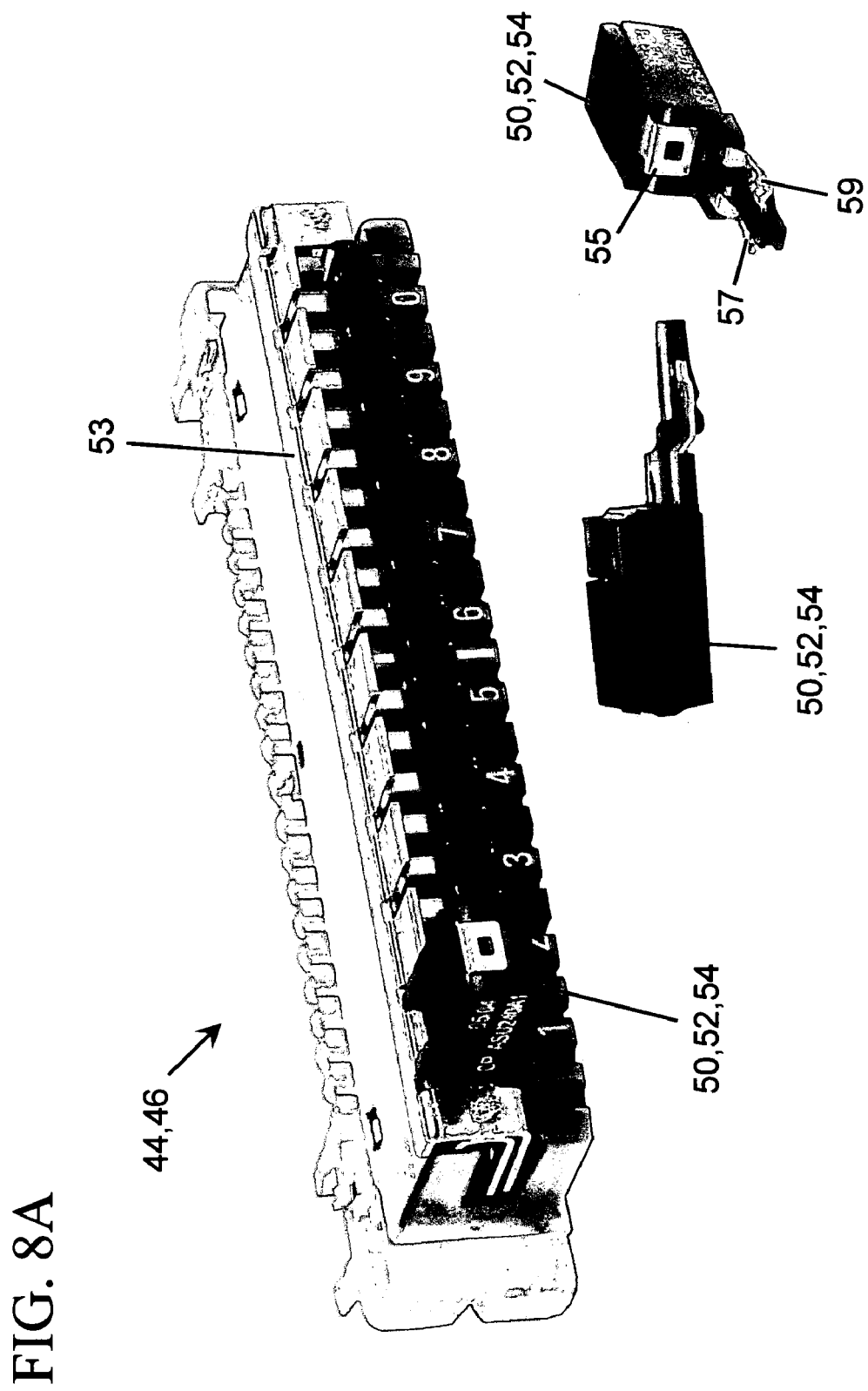
FIG. 8A is a perspective view of one embodiment of a termination block of the switching module of FIG. 7, shown with protector plugs.

Referring still to FIGS. 3 and 7, each of the first and second termination blocks 44, 46 of the switching module 28 includes first and second protector plugs 50, 52 respectively. The protector plugs 50, 52 are constructed to protect the splitter/DSL system from electrical overages, such as abnormal over-voltage and/or over-current. In particular, the protector plugs 50, 52 are in electrical communication with ground through a ground bar 53 (FIG. 8A). In the event of an abnormal over-voltage, for example, the protector plugs re-direct the over-voltage to ground.

Referring now to FIG. 8A, one embodiment of the first and second termination blocks 44, 46 is illustrated. In use, the protector plug 50, for example, includes first and second contacts (e.g. 57, 59) that are in electrical communication with the first connection 34 and the incoming DSL connection 36 (as shown schematically in FIG. 8). Likewise, the protector plug 52 includes first and second contacts (e.g. 57, 59) that are in electrically communication with the second connection 40 and the outgoing DSL connection 38. As previously discussed, the protector plugs 50, 52 function to re-direct any abnormal electrical overages to ground. In particular, the protector plugs 50, 52, include a switch mechanism (not shown) that re-directs any abnormal electrical overage through a ground contact 55, which is in electrical communication with the ground bar 53, to ground.

One of the features of the service distribution system 16 of FIG. 3 relates to the system's enhanced diagnostic testing capabilities not available in conventional arrangements. In particular, the terminating and switching modules 26, 28 are constructed and arranged such that the technician is able to check the condition of the service distribution system 16 along a number of connections or lines. For example, prior to disrupting the first signal path through the terminating module 26, the technician can insert a test cord in place of the activation plug 42. This permits the technician to monitor and look both ways along the line (i.e. upstream along the incoming block line 20, and downstream along either the first connection 34 or the distribution line 22) to detect possible problems that may affect telephone or DSL service.

In addition, the technician can insert a test cord in place of the first protector plug 50 within the first termination block 44 of the switching module 28. Inserting the test cord at this location permits the technician to monitor and look upstream and downstream along both the first connection 34 and the incoming DSL connection 36 to detect possible problems. Likewise, the technician can insert a test cord in place of the second protector plug 52 within the second termination block 46 of the switching module 28. Inserting the test cord at this location permits the technician to monitor and look along both the outgoing DSL connection 38 and the second connection 40 to detect possible problems.

Still referring to FIGS. 3 and 7, in the illustrated embodiment, the system 10 includes a third connection 56 and a third protector plug 54. The third connection 56 is provided for subscribers needing increased bandwidth or bonded bandwidth service, in contrast to a particular bandwidth service supported by only the second connection 40. In this instance, the third connection 56 is provided between the switching module 28 and an additional block site 58 (FIG. 3) of the terminating module 26. The additional block site 58 is interconnected to the distribution line 22, and the DSL signals from the second and third connections 40 and 56 are electronically bonded to provide the subscriber 24 with increased bandwidth service. As shown in FIG. 3, an additional activation plug 42 is inserted into the addition site 58 of the terminating module 26 so that the telephone/DSL signal is routed along the distribution line 22, as opposed to being mis-routed back to the incoming block line 20 and back to the cross-connect system 14.

The arrangement of the present system 10 supports pair bonding. Pair bonding is the joining of two or more DSL signals to provide a subscriber with increased bandwidth. In contrast, conventional arrangements do no support doubling of the bandwidth by electronically bonding DSL signals. The present system offers a manageable approach to connecting bonded DSL signals, which can easily be re-arranged in the event service changes are required.

Referring back to FIG. 3, the subsystems (12, 14, 16) of the present system 10 are each placed in series with one another. In particular, the cross-connect system 14 is placed or located in series with the pair gain system 12, and the service distribution system 16 is placed or located in series with the cross-connect system 14. In the illustrated embodiment, the service distribution system 16 is located downstream of the cross-connect system 14.

With this system arrangement, the service distribution system 16 receives the telephone signal from the cross-connect system 14, and sends the outgoing service signal to the subscriber without re-routing the outgoing service signal back through the cross-connect system 14. The placement and arrangement of the service distribution system 16 in relation to the cross-connect system 14 also supports pair bonding. In particular, each of the DSL signals from the connections 40 and 56 can be electronically bonded and provided to the subscriber 24 without re-routing the increased bandwidth service through the cross-connect system. This feature is particularly advantageous by permitting an operating company a migration path toward voice-over-internet-protocol (VOIP) technology.

Voice-over-internet-protocol technology relates to providing telephony service through the DSL system, thereby eliminating the necessity for a pair gain system and a cross-connect system. The present service distribution system 16 supports both VOIP technology and the customary pair gain/cross-connect systems. The present service distribution system 16 can also support a complete integration of VOIP technology, that is, removal of the upstream pair gain system 12 and cross-connect system 14 with continued connectivity support of downstream subscriber services 24.

Figure 9:
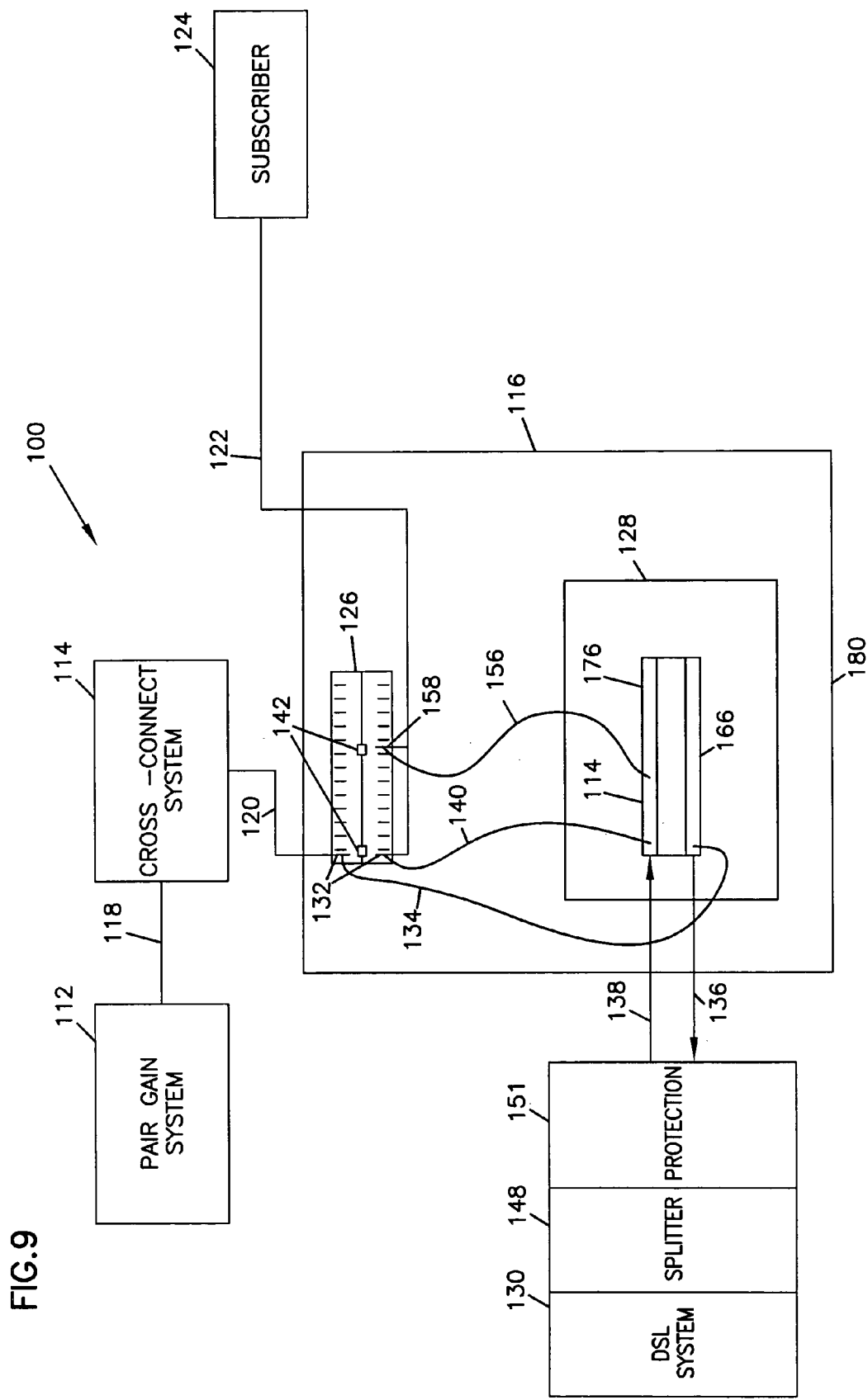
FIG. 9 is a schematic representation of another embodiment of a system for broadband service delivery, in accordance with the principles of the present disclosure.

Referring now to FIG. 9, another embodiment of a system 100 for providing broadband service is illustrated. Similar to the previously described system 10, the system 100 of FIG. 9 has a number of subsystems: including, a pair gain system 112, a cross-connect system 114, and a service distribution system 116. The systems 112, 114, 116 are interconnected by a feeder line 118, an incoming block line 120, and a distribution line 122, and to provide a subscriber 124 with either the standard telephone service or the DSL service.

The service distribution system 116 of FIG. 9 generally includes a terminating block or module 126 and a switching module 128. The switching module 128 is interconnected to a splitter 148 and DSL system 130. For standard telephone service, the incoming, pair gain signal is routed through the terminating module 126 of the service distribution system 116, similar to the previously described system 10. To provide DSL service to the subscriber 124, a service technician accesses a dedicated site 132 of the terminating module 126. The technician re-routes the telephone signal at the dedicated site 132 of the terminating module 126 to the switching module 128. The switching module 128 passes the signal to the splitter 148, which functions to combine the telephone signal with the DSL signal from the DSL system 130.

The terminating module 126 of the system 100 of FIG. 9 is similar in construction and operation to the terminating module 26 of the previously described system 10. For example, the incoming block line 120 and a first connection 134 can be double terminated at the block site 132. In addition, the distribution line 122 and a second connection 140 can be double terminated at the block site 132. As previously described, the added first and second connections 134, 140 and an activation plug 142 are used for disrupting the first signal path through the terminating module 126 and re-routing the telephone signal from the pair gain system 112 to the second signal path.

The switching module 128 of the system 100 of FIG. 9, however, has a different arrangement than previously described. In particular, the switching module 128 of the present system 100 includes only a first termination block 144 having a first row of contacts 166 and a second row of contacts 176. The first connection 134 interconnects the terminating module 126 to the first row of contacts 166 of the termination block 144. An incoming DSL connection 136 provides an interconnection between the splitter 148 and the first row of contacts 166 of the first termination block 144. The first connection 134 and the incoming DSL connection 136 are double terminated at the first row of contacts 166. An outgoing DSL connection 138 provides an interconnection between the splitter 148 and the second row of contacts 176. The outgoing DSL connection 138 is double terminated with a second connection 140 at the second row of contacts 176. The second connection 140 interconnects the second row of contacts 176 of the termination block 144 with the terminating module 126.

Unlike the previous embodiment, the termination block 144 of the switching module 128 is not in electrical communication with ground. This is because protection 151 from over-voltage and/or over-current is provided by a system other than the service distribution system 116. In the illustrated embodiment, the protection 151 is provided at the splitter 148. The protection 151 can be provided in the form of a conventional 5-pin protector, for example. Other protection systems and configurations that protect the splitter 148 and DSL system 130 from over-voltage and/or over-current can be used.

The first termination block 144 of the switching module 128 has normally-open contacts between pairs of insulation displacement connections. Each of the normally-open contacts provides a location at which the activation plugs 142 can be stored. In the present system 100, the normally-open contacts are not closed by a plug (e.g., 50, 52 of FIG. 3) for purposes of this system application. Also, because protection plugs are not used in this application, only the first termination block 144 is required. In contrast, in the previous embodiment of FIG. 3, two blocks (e.g. 44, 46) are provided because the ground bar 53 (FIG. 8A) utilized with the plugs 50, 52 blocks access to field installation of the first and second connection 34, 40. (Typically, the incoming and outgoing DSL connections 36, 38 are pre-wired prior to installation of the ground bar 53.)

Still referring to FIG. 9, in the illustrated embodiment, the system 100 includes a third connection 156 provided between the switching module 128 and an additional block site 158 of the terminating module 126. The third connection 156 is provided for subscribers needing increased bandwidth or bonded bandwidth service. Similar to the previous embodiment, the additional block site 158 is interconnected to the distribution line 122, and the DSL signals from the second and third connections 140 and 156 are electronically bonded to provide the subscriber 124 with increased bandwidth service. Likewise, an additional activation plug 142 is inserted into the addition site 158 of the terminating module 126 to prevent the telephone/DSL signal from being mis-routed back to the cross-connect system 114.

The subsystems (112, 114, 116) of the present system 10 are each placed in series with one another. In particular, the cross-connect system 114 is placed or located in series with the pair gain system 112, and the service distribution system 116 is placed or located in series with the cross-connect system 114. In the illustrated embodiment, the service distribution system 116 is located downstream of the cross-connect system. As previously described, the placement and arrangement of the service distribution system 116 in relation to the cross-connect system 114 supports pair bonding and VOIP technology.

Figure 10:
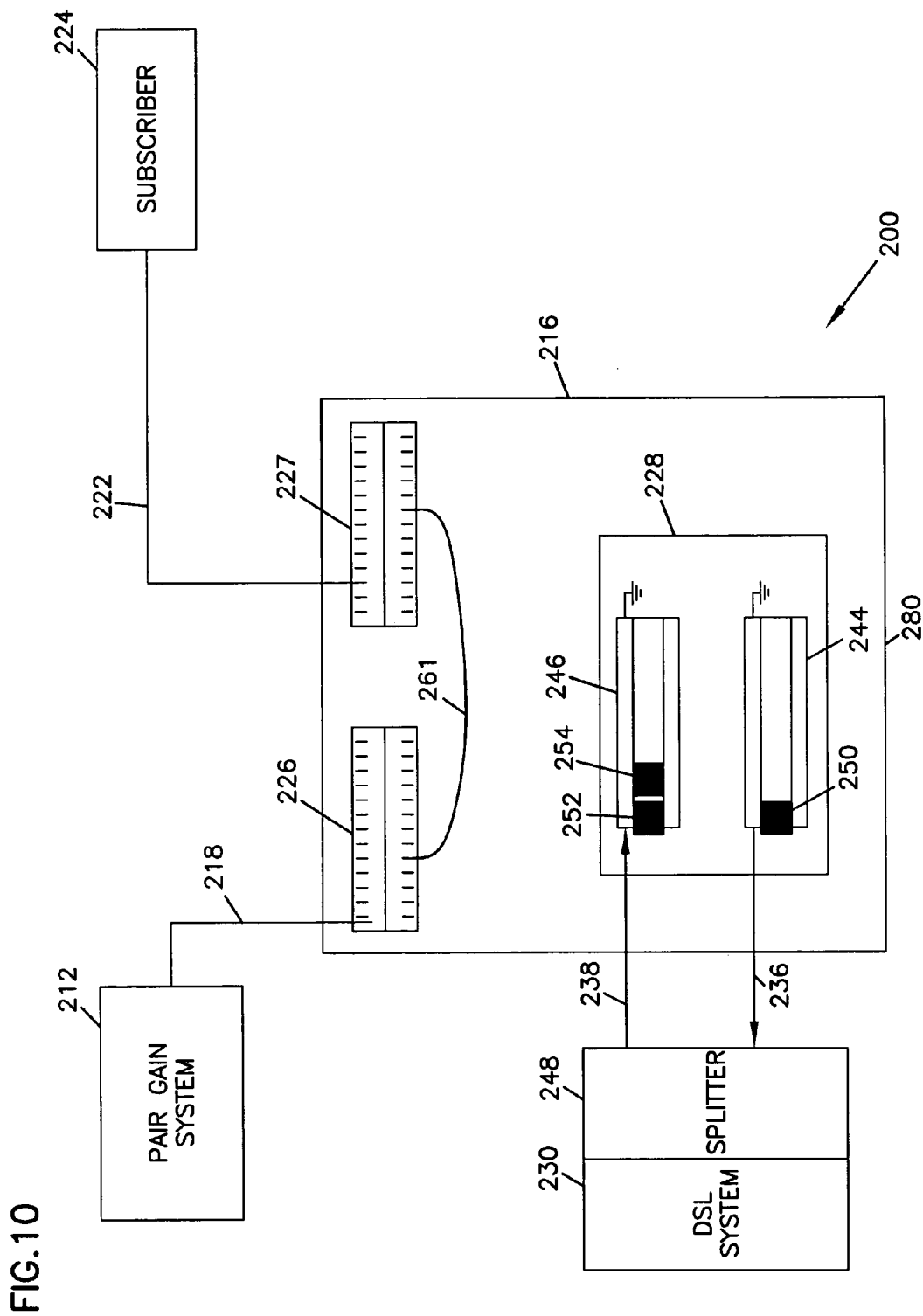
FIG. 10 is a schematic representation of still another embodiment of a system for broadband service delivery, in accordance with the principles of the present disclosure, shown in a configuration providing standard telephone service.
Figure 11:
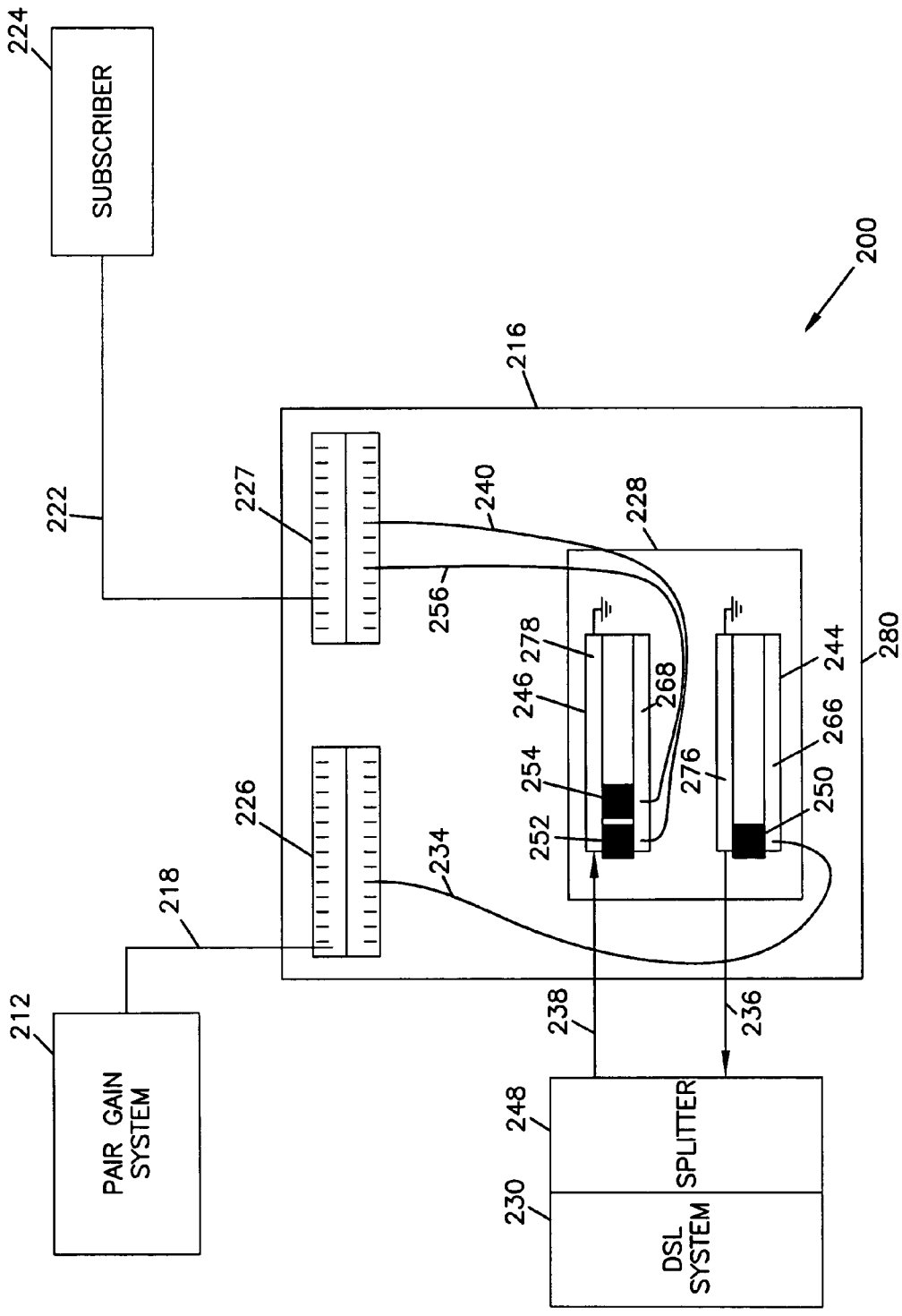
FIG. 11 is a schematic representation of the system of FIG. 10, shown in a configuration providing DSL service.

Referring now to FIGS. 10 and 11, still another embodiment of a system 200 for providing broadband service is illustrated. The system 200 includes a pair gain system 212 and a service distribution system 216. The service distribution system 216 generally includes first and second terminating modules 226, 227, and a switching module 228.

Referring to FIG. 10, to provide standard telephone service, a pair gain signal from the pair gain system 212 is received by the first terminating module 226 of the service distribution system 216 through a feeder line 218. The pair gain signal is then passed to the second terminating module 227 via a removable jumper connection 261. From the second terminating module 227, the pair gain signal is routed directly to a subscriber 224 through a distribution line 222. That is, the telephone signal is routed through the terminating modules 226, 227 to the subscriber 224, without being directed or routed through the switching module 228.

In the illustrated system 200, the functionality of a cross-connect system (e.g. 14, 114) is incorporated into the service distribution system 216. In particular, the pair gain system 212 connects directly to the service distribution system 216 by the feeder line 218. No separate cross-connect system (e.g. 14, 114) is required. The first terminating module 226 and the second terminating module 227 of the service distribution system 216 instead provide the cross-connection functionality previously provided by the separate cross-connect system (e.g. 14, 114).

For example, cross-connection functionality, such as connect and disconnect configurations necessary to support a particular subscriber requiring more incoming lines than a single dedicated line, are accomplished by the connection configuration between the first and second terminating modules 226, 227. In particular, the terminating blocks 226, 227 support a greater number of connections to the subscriber 224 than the number of connections from the pair gain system 212. One advantage of this feature is that a separate box for supporting cross-connect functions is no longer needed. Another advantage of this feature is that shorter jumper wires can used between the feeder line 218 and the distribution system 216, and between the distribution system 216 and a splitter 248 and DSL system 230. In contrast, conventional arrangements required extra binding posts to support the inputs and outputs of a DSL system.

Also, because the cross-connect functionality is incorporated into the service distribution system 216, the "incorporated" cross-connect system can be located more proximate to the subscriber 224. That is, the service distribution system having the cross-connect functionality can be located closer to the subscriber and support higher bandwidth while still accommodating aesthetic preferences.

For instance, to support higher bandwidth needs of subscribers, conventional systems require multiple telecommunication cabinets. Because of the necessity of multiple cabinets, most operating companies placed the cabinets remote of neighborhoods, for example, for aesthetic purposes. The farther a signal is carried, however, the more likely it is that distortion issues will arise. The present service distribution 216 permits placement of the system closer to subscribers because the system can support the subscribers' higher bandwidth needs service within a single cabinet, thereby addressing aesthetic preferences while lessening the likelihood of signal distortion.

Referring now to FIG. 11, to provide DSL service (i.e. the telephone/DSL signal) to a particular subscriber 224, a service technician re-routes the telephone signal from the first terminating module 226 to the switching module 228. In particular, the jumper connection 261 is removed, and a first connection 234 is established between a first termination block 244 of the switching module 228 and the first terminating block 226. Also a second connection 240 is established between a second termination block 246 of the switching module 228 and the second terminating block 227.

The switching module 228 is similar to the switching module 28 of the system 10 in FIG. 3. For example, the first termination block 244 of the switching module 228 includes a first row of contacts 266 and a second row of contacts 276. The second termination block 246 includes a first row of contacts 268 and a second row of contacts 278. The first connection 234 interconnects the first terminating module 226 to the first row of contacts 266 of the first termination block 244, and the second connection 240 interconnects the second terminating module 227 to the first row of contacts 268 of the second termination block 246. Also, an incoming DSL connection 236 interconnects the splitter 248 to the second row of contacts 276 of the first termination block 244, and an outgoing DSL connection 238 interconnects the splitter 248 to the second row of contacts 278 of the second termination block 246. The second rows of contacts 276, 278 of the first and second termination blocks 244, 246 are connected to ground.

In this system 200, a third connection 256 can also be established between the switching module 228 and an additional block site of the second terminating module 227 to provide subscribers with increased bandwidth service.

Also similar to the system 10 of FIG. 3, the first and second termination blocks 244, 246 of the switching module 228 include protector plugs, e.g., 250, 252, 254. The protector plugs function in the same manner as previously described for protecting the DSL system 230 from abnormal over-voltage and/or over-current.

Figure 12:
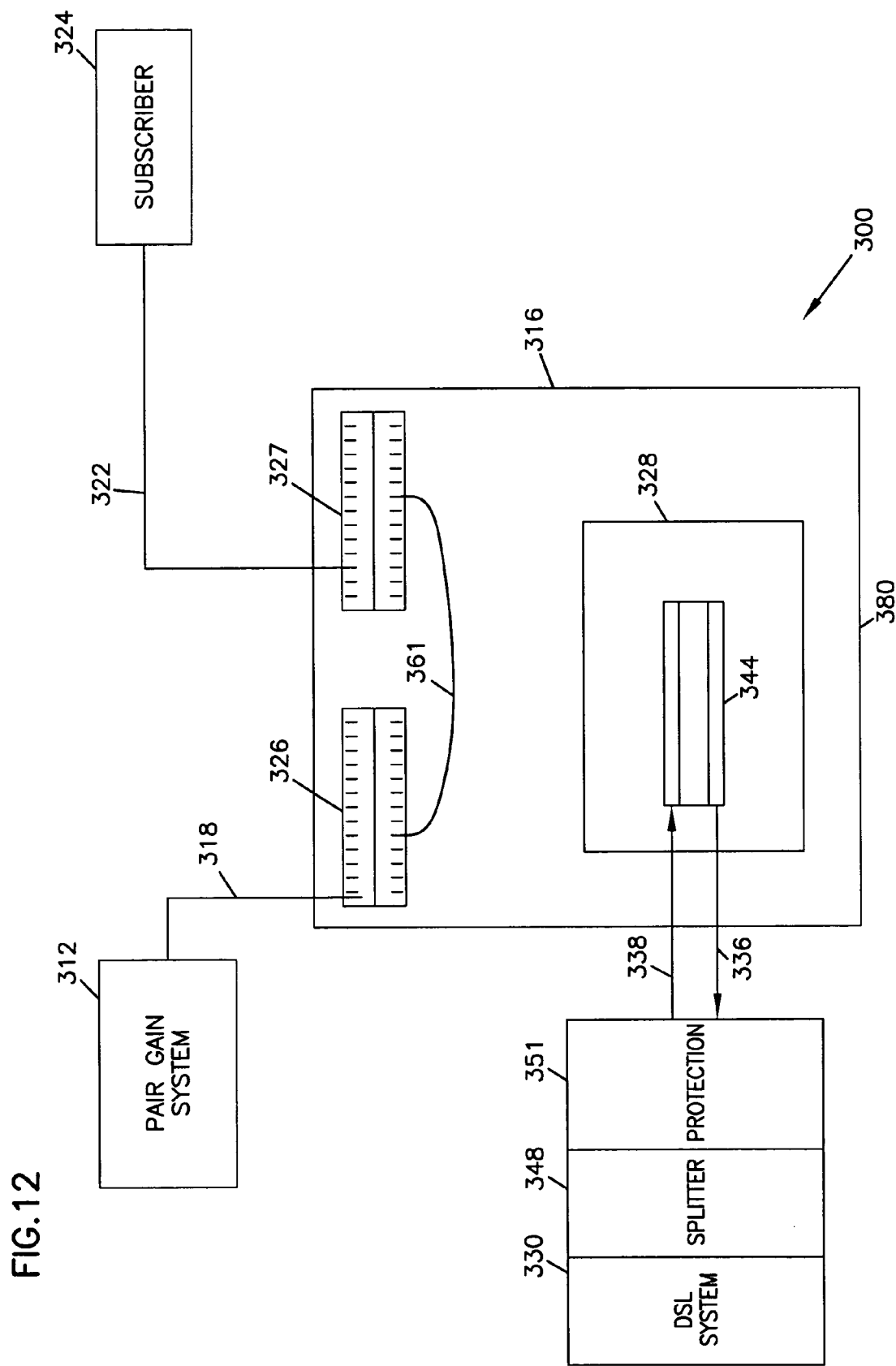
FIG. 12 is a schematic representation of yet another embodiment of a system for broadband service delivery, in accordance with the principles of the present disclosure, shown in a configuration providing standard telephone service.
Figure 13:
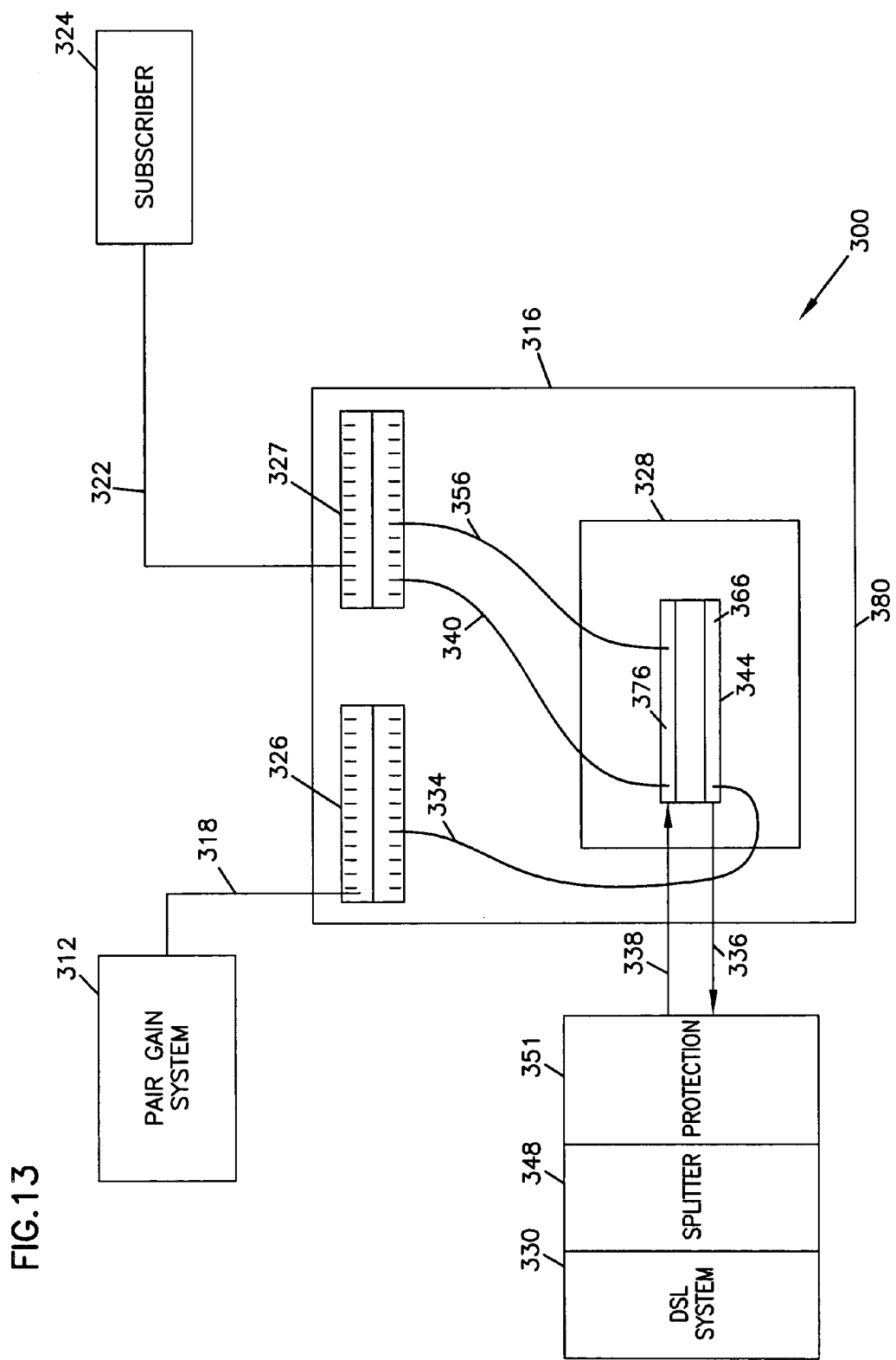
FIG. 13 is a schematic representation of the system of FIG. 12, shown in a configuration providing DSL service.

Referring now to FIGS. 12 and 13, yet another embodiment of a system 300 for providing broadband service is illustrated. The system includes a pair gain system 312 and a service distribution system 316. The service distribution system 316 generally includes first and second terminating modules 326, 327, and a switching module 328.

Similar to the system 200 of FIGS. 10-11, the system 300 of FIGS. 12-13 incorporates the functionality of a cross-connect system (e.g. 14, 114) into the service distribution system 316. In particular, the pair gain system 312 connects directly to the service distribution system 316 by a feeder line 318. The first terminating module 326 and the second terminating module 327 of the service distribution system 316 provide the cross-connection functionality previously provided by a separate cross-connect system (e.g. 14, 114).

Referring to FIG. 12, to provide standard telephone service, a pair gain signal from the pair gain system 312 is received by the first terminating module 326 of the service distribution system 316 through the feeder line 318. The pair gain signal is then passed to the second terminating module 327 via a removable jumper connection 361. From the second terminating module 327, the pair gain signal is routed directly to the subscriber 324 through a distribution line 322. The telephone signal is routed through the terminating modules 326, 327 to the subscriber 324, without being directed or routed through the switching module 328.

Referring now to FIG. 13, to provide DSL service (i.e. the telephone/DSL signal) to a particular subscriber 324, a service technician re-routes the telephone signal from the first terminating module 326 to the switching module 328. In particular, the jumper connection 361 is removed, and first and second connections 334, 340 are added between each of the first and second terminating modules 326, 327 and the switching module 328.

The switching module 328 of the system 300 of FIGS. 12-13 is similar to the switching module 128 of the system 100 of FIG. 9. In particular, only a first termination block 344 having a first row of contacts 366 and a second row of contacts 376 is provided. An incoming DSL connection 336 interconnects the splitter 348 to the first row of contacts 366 of the first termination block 344, and an outgoing DSL connection 338 interconnects the splitter 348 to the second row of contacts 376. Also similar to the system embodiment of FIG. 9, the termination block 344 of the switching module 328 is not in electrical communication with ground. Instead, protection 351 of the splitter 348 and DSL system 330 from over-voltage and/or over-current is provided by a system other than the service distribution system 316.

Still referring to FIG. 13, a third connection 356 can also be established, as previously described, between the switching module 328 and an additional block site of the second terminating module 327 to provide subscribers with increased bandwidth service.

The service distribution systems of the disclosed systems 10, 100, 200, 300 can be used in a variety of telecommunication and broadband service delivery applications. Further, the service distribution systems can include a number of various types of components to accomplish the delivery of service in accord with the principles disclosed. For instance, example modules of the terminating module (e.g., 26 and 126), as shown in FIGS. 3 and 9, that can be used in the disclosed service distribution system 16, 116 include blocks available from Krone GmbH, now part of ADC Telecommunications, Inc., such as Series 2 blocks and NT blocks. The terminating module of each system may be referred to as a "disconnect block", which disconnects the electrical connection between the pairs of insulation displacement connections by insertion of a non-conductive plug (i.e., the activation plug 42, 142). Also, example modules of the first and second terminating modules (e.g., 226, 227, 326, 327), as shown in FIGS. 10-13, that can be used in the disclosed service distribution system 216, 316 include blocks, such as NT blocks, available from Krone GmbH, now part of ADC Telecommunications.

Example modules of the switching module (e.g., the termination blocks 44, 46, 244, 246 of the switching module 28, 228), as shown in FIGS. 3 and 10-11, that can be used in the disclosed service distribution system 16, 216 include blocks, such as Series 2 blocks and NT blocks, available from Krone GmbH, now part of ADC Telecommunications, Inc. The switching module may be referred to as a "switching block", which has a normally-open contact between the pairs of insulation displacement connections. To close the switch, a plug (e.g., a protector plug 50, 250) is inserted within electrical contacts positioned to engage the open switch contacts. An example plug to close the switch of the switching block includes COMPROTECT™ plugs available from Krone GmbH, now part of ADC Telecommunications, Inc. Such plugs and switching blocks offer circuit protection for the system. Also, example modules of the switching module 128, 328, as shown in FIGS. 9 and 12-13, that can be used in the disclosed service distribution system 116, 316 include blocks available from Krone GmbH, now part of ADC Telecommunications, Inc., such as Series 2 blocks and NT blocks.

In addition, the service distribution systems (i.e., 16, 116, 216, 316) of the disclosed systems 10, 100, 200, 300 can be provided or housed in an enclosure (as schematically represented in the drawings by reference numbers 80, 180, 280, and 380). The enclosure can include, for example, a cabinet, a panel, a box, a rack, and other frame or structural supports either completely or partially enclosing the service distribution system. In the alternative, the service distribution systems (i.e., 16, 116) can also be retro-fit to an existing enclosure.

Figure 14:
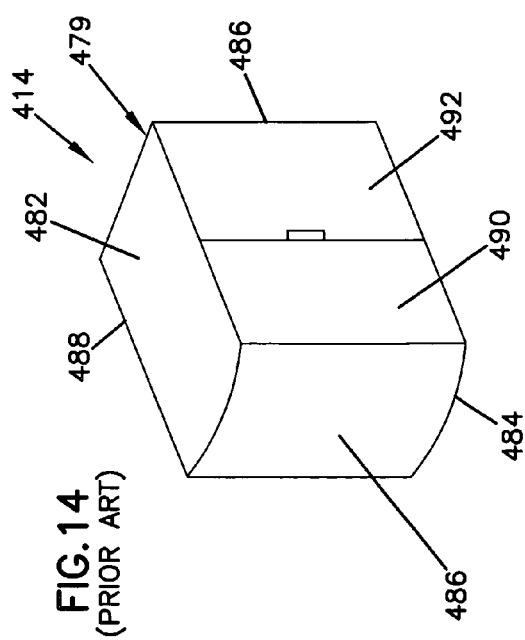
FIG. 14 is a perspective view of a prior art enclosure commonly used in the prior art system schematically represented in FIG. 1.

For example, referring to FIG. 14, an existing enclosure 479 of a cross-connect system 414 is illustrated. The enclosure 479 includes top and bottom walls 482, 484, side walls 486, and a rear wall 488. The walls, 482, 484, 486, and 488 define a primary interior 483 of the enclosure 479. Hinged panels or doors, including first and second panels 490, 492 are mounted at the front of the enclosure 479 to provide access into the primary interior 483 of the enclosure. The hinged panels 490, 492 are generally flat or planar.

In such conventional arrangements, when additional cross-connections are needed, capacity of the existing cross-connect enclosure 479 is typically expanded by re-skinning the enclosure. This method involves removing the outer sheet metal structure (i.e. the walls 482, 484, 486, and 488) of the enclosure, and replacing the sheet metal structure with a larger sheet metal structure. Additional binding posts are also typically added during the expansion. Re-skinning an enclosure can be costly, as the entire outer structure is often replaced by a structure that is custom designed for the particular system requirements.

Figure 15:
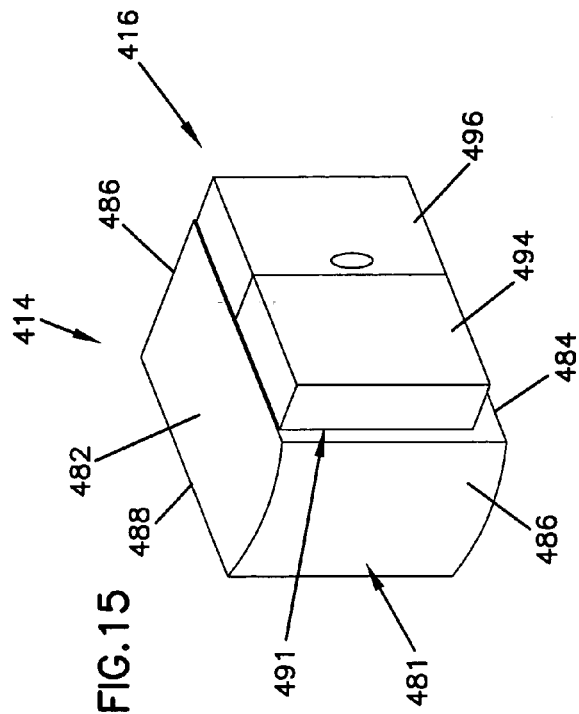
FIG. 15 is a perspective view of a retro-fit enclosure having deep-pocket panels.
Figure 16:
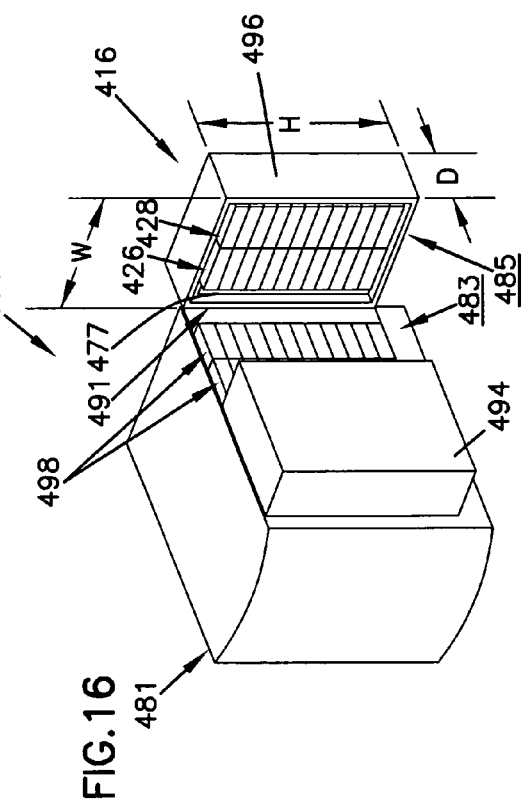
FIG. 16 is a perspective view of the retro-fit enclosure of FIG. 15, showing one of the deep-pocket panels in an opened position.
Figure 17:
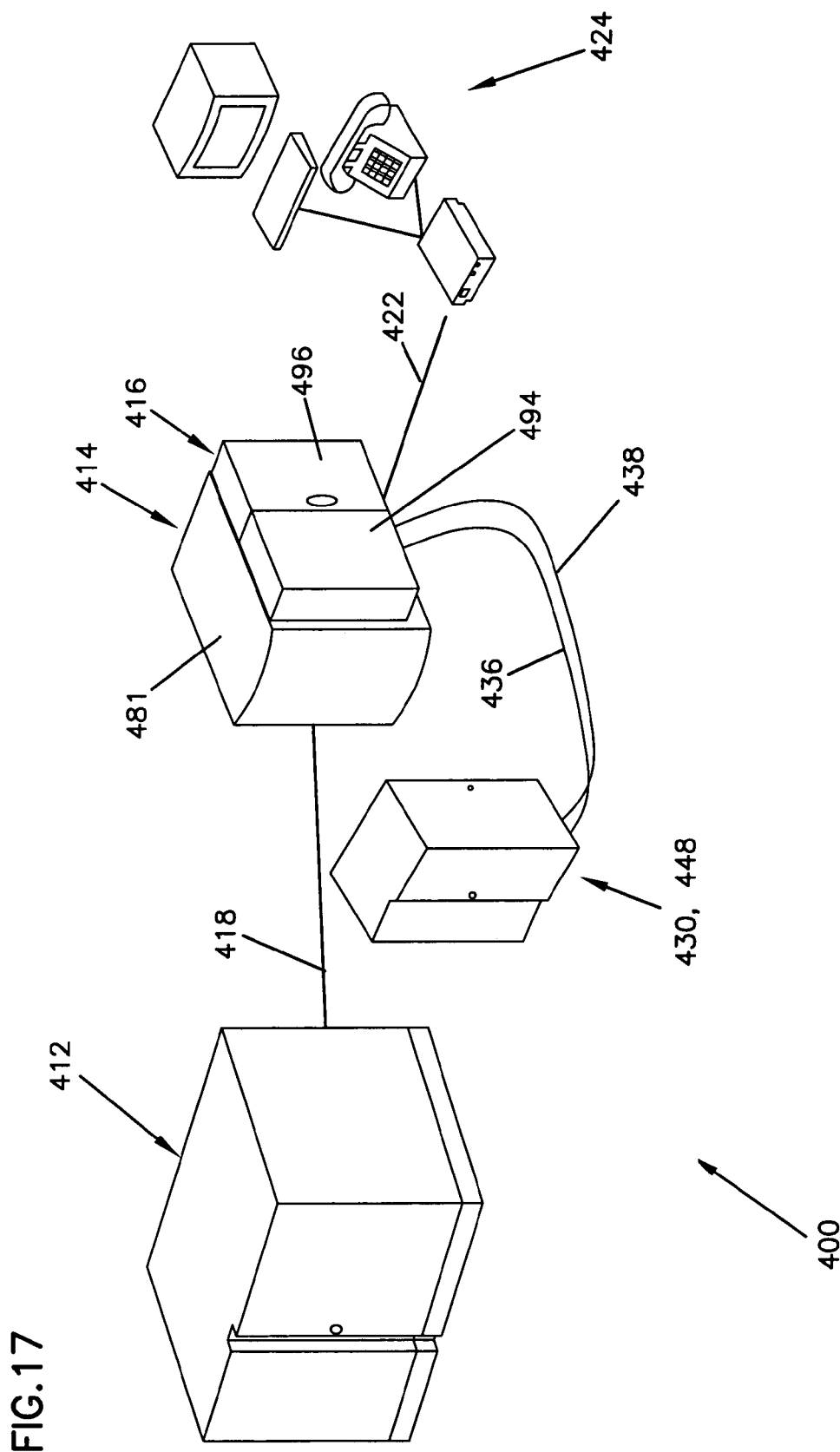
FIG. 17 is a perspective view of a system for broadband service delivery, in accordance with the principles of the present disclosure, and including the retro-fit enclosure of FIGS. 15 and 16.

FIGS. 15-17 illustrate another embodiment of a system 400 for providing broadband service, in accordance with the principles disclosed. The system 400 features the incorporation of a service distribution system 416, such as the systems disclosed in FIGS. 3 and 9, into the enclosure 479 of an existing cross-connect system 414. The existing enclosure 479 (FIG. 14) can be modified to provide a retro-fit enclosure 481 (FIG. 15) that houses both the cross-connect system 414 and the service distribution system 416. In particular, the flat hinged panels 490, 492 of the existing cross-connect enclosure 479 are replaced with hinged deep-pocket panels 494, 496 (FIG. 15). The hinged deep-pocket panels 494, 496 include hinged mounting structure 491 to mount the deep-pocket panels to the existing enclosure 479. The deep-pocket panels 494, 496 increase the overall interior volume of the enclosure so that both the cross-connect system 414 and the service distribution system 416 can be placed within the single enclosure.

The deep-pocket panels 494, 496 of the disclosed retro-fit enclosure 481 increase the service capacity of an existing system without re-configuring the existing cross-connect system. For example, referring to FIG. 16, general cross-connect components, such as cross-connect blocks 498, are located within the primary volume 483 of the cross-connect enclosure 481. When the system 400 is expanded to incorporate the service distribution system 416, the cross-connect blocks 498 remain at the original locations in the primary volume 483 of the enclosure 481.

As shown in FIG. 16, the service distribution system 416 is preferably located within an added volume 485 of the cross-connect enclosure 481. The added volume 485 is defined by the interior of the deep-pocket panels 494, 496. For example, the terminating modules 426 and the switching modules 428 of the service distribution system 416 are mounted to the panels 494, 496 within the added volume 485. The modules 426, 428 can be mounted to an inner surface of the panel by component mounting structure 477, such as brackets, for example. Jumper or wire management (not shown) can also be included within the enclosure 481 to manage wires when the panels 494, 496 are opened and closed.

Referring still to FIG. 16, each of the deep-pocket panels 494, 496 has a width W, a height H, and a depth D; although the disclosed principles can be applied in a variety of sizes and applications. The width W of the panels is preferably between about 35 and 45 inches; more preferably about 38 inches. The height H of the panels is preferably between about 35 and 45 inches; more preferably about 36 inches. The depth D of the panels is preferably between about 6 and 15 inches; more preferably about 8 inches. Accordingly, the added volume 485 of each of the panels is typically between about 4 and 18 cubic feet; more preferably about 6 cubic feet. The more preferred dimensions (i.e. a deep-pocket panel that is 38"w× 36"h×8"d) generally apply to existing enclosures 479 having a primary volume 483 of about 36 cubic feet. The overall volume of a retro-fit enclosure 481 having two deep-pocket panels thereby increases by about 35 percent. This percentage can be applied to a number of different sizes of existing cross-connect enclosures.

The disclosed retro-fit enclosure arrangement permits an operating company to expand the capability of an existing system without adding additional enclosures. Further, the retro-fit enclosure 481 has no effect on existing feeder line or distribution line configurations. In addition, the added volume 485 enables mounting of input and output blocks of the DSL system 430 into the primary volume of the enclosure 481 where the feeder and distribution line connections exist, while still supporting proper jumper management. The existing system can thereby be retro-fit to provide the services as herein described in a cost-efficient manner, and while still accommodating aesthetic preferences.

Referring to FIG. 17, the system 400 for providing broadband service is shown with the retro-fit enclosure 481. The system 400 generally includes a pair gain system 412 interconnected to the cross-connect system 414 via a feeder line 418. The cross-connect system 414 is interconnected to the service distribution system 416. Both of the cross-connect system 414 and the distribution system 416 are housed within the retro-fit enclosure 481. A DSL system 430 and splitter 448 are interconnected to the service distribution system 416 via incoming and outgoing DSL connections 436, 438. Standard telephone service and DSL service are provided to a subscriber 424 by a distribution line 422. Greater details of the specific system configurations that can be used in the system 400 are described herein with respect to the systems shown in FIGS. 3 and 9.

The present systems (e.g., 10, 100, 200, 300, 400) of FIGS. 3-13 are represented in association with a single subscriber (e.g., 24, 124, 224, 324, 424) for purposes of clarity. As can be understood, the systems are designed to support and provide standard telephone and DSL service to a plurality of subscribers. In particular, the systems of FIGS. 3, 9-13 and 17 are configured to support up to 1500 pairs of distribution lines (e.g., 22, 122, 222, 322, 422); 432 pairs of which can be DSL service.

The above specification provides a complete description of the present invention. Since many embodiments of the invention can be made without departing from the spirit and scope of the invention, certain aspects of the invention reside in the claims hereinafter appended.

What is claimed is:

1. A method of modifying a system enclosure, the method comprising the steps of:
    a) removing access panels from a cross-connect system enclosure, the access panels providing access to an interior of the enclosure, the interior defining a primary volume of the enclosure, a number of cross-connect telecommunication blocks being located within the primary volume of the interior;
    b) securing deep-pocket panels to the enclosure, the deep-pocket panels defining an added interior volume; and
    c) mounting components of a service distribution system within the added interior volume of the deep-pocket panels, the components of the service distribution system including terminating modules and switching modules.

2. The method of claim 1, wherein the step of securing the deep-pocket panels to the enclosure includes increasing an overall volume of the enclosure by about 35 percent.

3. The method of claim 1 wherein the step of securing includes securing the deep-pocket panels to the enclosure, the deep-pocket panels being exterior panels located outside the primary volume of the enclosure when the enclosure is closed.

4. The method of claim 1, wherein the step of removing access panels from the cross-connect system enclosure includes removing access panels from the cross-connect system enclosure, the enclosure including exterior walls that define the interior of the enclosure, and wherein the deep-pocket panels are secured to the exterior walls, the deep-pocket panels being moveable between open positions and closed positions to provide access to the primary volume of the enclosure.

5. The method of claim 1, wherein the step of securing the deep-pocket panels includes securing the deep-pocket panels to the enclosure, the deep-pocket panels defining the added interior volume, the added interior volume being about 6 cubic feet.

6. The method of claim 1, further including providing:
   a) a pair gain system;
   b) a cross-connect system arranged to receive a telephone signal from the pair gain system;
   c) the service distribution system arranged to receive the telephone signal from the cross-connect system; and
   d) a digital subscriber line system interconnected to the service distribution system;
   e) wherein the service distribution system generates outgoing subscriber signals, the outgoing subscriber signals including standard telephone signals and telephone/digital subscriber line signals, the cross-connect system and the service distribution system being located within the cross-connect system enclosure.

7. The method of claim 6, wherein the step of mounting components including the terminating modules and the switching modules includes mounting components including the terminating modules which are configured to route the outgoing subscriber signals to subscribers and the switching modules which are interconnected between the terminating modules and the digital subscriber line system.

* * * * *

UNITED STATES PATENT AND TRADEMARK OFFICE
CERTIFICATE OF CORRECTION

PATENT NO.       : 7,643,631 B2
APPLICATION NO.  : 11/212924
DATED            : January 5, 2010
INVENTOR(S)      : Bryan Kennedy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1145 days.

Signed and Sealed this

Twenty-first Day of December, 2010

David J. Kappos
*Director of the United States Patent and Trademark Office*